Figure 1:
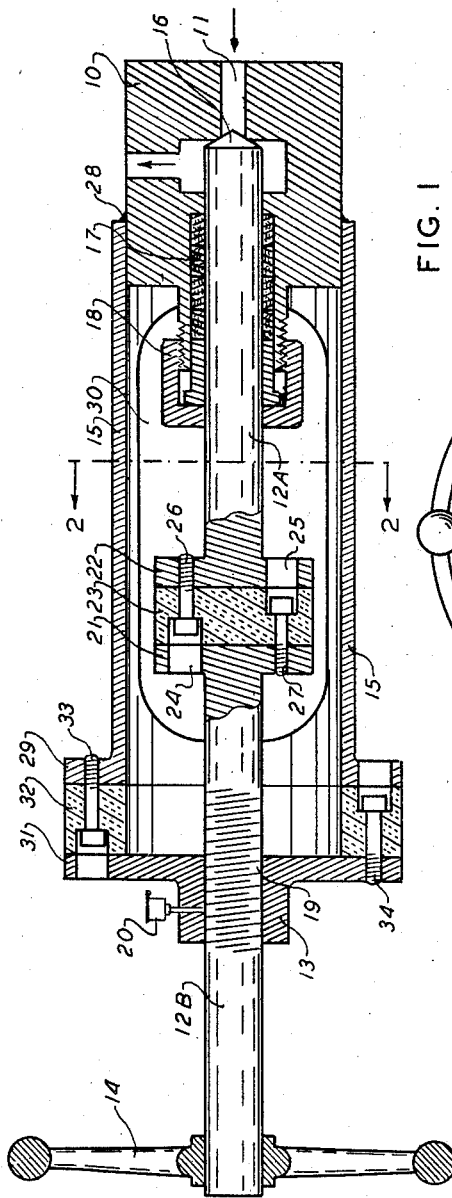

Feb. 10, 1948. C. R. ANDERSON 2,435,731
EXPANSION VALVE
Filed Oct. 21, 1943

CARL R. ANDERSON
*INVENTOR*

*ATTORNEYS*

Patented Feb. 10, 1948

2,435,731

UNITED STATES PATENT OFFICE 2,435,731

EXPANSION VALVE

Carl R. Anderson, Detroit, Mich., assignor to Air Products Incorporated, Detroit, Mich., a corporation of Michigan Application October 21, 1943, Serial No. 507,092

8 Claims. (Cl. 251—43)

This invention relates to expansion valves.

In the liquefaction and fractionation of air and other mixed gases it is customary to reduce the pressure on a highly compressed or liquefied gas by passing it through an orifice to a region of lower pressure.

In this expansion the gas, if merely highly compressed, is reduced in temperature by the well known Joule-Thompson effect. If the gas so expanded has previously been liquefied, a further reduction in temperature is occasioned by the conversion of sensible to latent heat in the evaporation of the liquid at the reduced pressure.

The throttling orifices used for effecting this pressure reduction, known in the industry as expansion valves, operate under very difficult conditions. The pressures carried are very high, often of the order of 200 atmospheres or more, while the temperatures reached at the point of expansion are usually very low, of the order of 100° to 250° below zero centigrade. In the face of these difficulties such valves must be capable of minute regulation and should be completely dependable in function.

It has been the practice heretofore to use for this purpose a modified needle valve having the stem threads close to the needle and therefore in the body or cold end of the valve. It will be remembered in this connection that the valve body is necessarily buried deeply in insulation and operates at a very low temperature while the projecting stem and hand-wheel are exposed to the atmosphere. Between the cold zone in which the body is located and the warm zone of the outer stem and hand-wheel there is thus an extreme temperature difference which tends to exaggerate the flow of heat from the warm end to the cold end of the valve, to the serious detriment of its efficiency as a means of producing refrigeration.

The valves now in use, having the stem threads in the body, have occasioned much trouble by reason of galling and freezing of these threads by means of which adjustment is effected. It seems to be impossible to lubricate these threads adequately at the extremely low temperatures attained by the valve body when expanding high pressure gases. Further, the unsupported projecting stem tends to swage and loosen the stem packing which, by reason of its location is difficult to maintain. The inability to open, close or adjust one of these valves when needed, or the necessity for closing it to replace leaking packing, may throw an entire liquefying or fractionating plant out of balance or even interrupt its operation.

I have improved on the conventional forms of expansion valve in the following particulars: (1) in removing the stem threads from the valve body and placing them in a separate thread block liberally spaced from the body and in the warm end of the assembly; (2) in placing a thermal break in the stem at a point intermediate the body and the threaded portion of the stem; (3) in attaching the thread block to the body by a rigid yoke structure which supports the outer end of the stem and prevents side strains; (4) in interposing a thermal break in the yoke structure or between it and the thread block; (5) in providing a yoke structure having a very low relationship of heat conductivity to rigidity; (6) in providing a stem structure having the same characteristics.

By these changes I have removed the adjusting threads from the cold end of the valve to a region of substantially atmospheric temperature, thus allowing for perfect lubrication, avoiding any tendency to sieze or gall and permitting the use of closely pitched fine threads for delicate adjustment. I have also produced an assembly of extreme rigidity and, in substantially segregating the warm end from the cold end of the valve, have materially increased its thermal efficiency.

Figure 2:
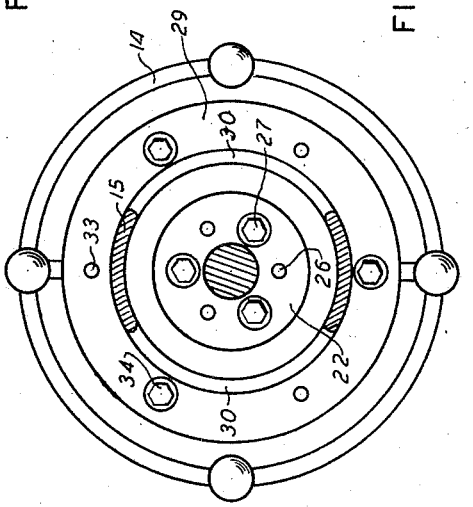

It will be evident that the above named improvements may be embodied in valves of diverse forms and proportions, and the form illustrated in the attached drawings will be understood to be exemplary only. In these drawings:

Fig. 1 is a longitudinal section through a preferred form of the valve assembly, and Fig. 2 is a section and partial elevation as on the line 2—2 of Fig. 1.

Referring to the drawings, the valve consists, operatively, of the following main elements: an orifice block or valve body 10 having a tubular orifice 11; a sectional valve stem 12A—12B; a thread block 13; a hand-wheel 14 and a yoke member 15 connecting and spacing the body and the thread block.

The section 12A of the valve may have a tapering or other end 16 movable toward and away from orifice 11 and adapted to open and close the orifice and adjust its free area. A seat for stem packing 17 is formed in the body and the packing is adjusted by the usual gland and nut combination 18.

The section 12B of the stem is provided with a threaded portion 19 engaging corresponding threads in the thread block. An oil cup or grease plug indicated at 20 should be provided to lubricate these threads.

The two sections of the stem are connected by means of flanges 21 and 22 individually bolted to a thick ring or disc 23 of Bakelite or other solid material of a low order of heat conductivity, as for example (but not for purposes of limitation) in the neighborhood of 1 B. t. u. per hour per cubic foot per degree F. or less. Many low heat conductivity materials such as phenol formaldehyde resins and other plastics having low heat conductivities, e. g., ⅛ B. t. u. per hour per cubic foot per degree F., are available and suitable. A thermal break of material having the lowest heat conductivity possible coupled with sufficient strength is, of course, preferred. These flanges are recessed as at 24 and 25 to clear the heads of bolts 26 and 27. The recesses should be deep enough that no part of the head projects into the opening through the flange, in order to reduce heat transmission by radiation to the lowest terms.

These bolts alternate in direction: bolts 26 are threaded into flange 22 and their heads bear only on the Bakelite ring and neither contact nor receive any material amount of radiated heat from flange 21, while bolts 27 are threaded into flange 21 only and neither contact nor receive any material amount of radiated heat from flange 22. Thus each of the flanges is in contact with only the relatively non-conductive material of the ring or disc and an effective thermal restriction or obstacle to heat transfer is provided in the stem between the body 10 and the stem threads 19.

Such an obstacle is referred to hereinafter as a "thermal break," but it will be understood that this term does not connote a complete barrier to heat transmission, impossible to realize in practice, but rather an obstacle which permits only an insignificant amount of heat to pass.

The yoke member 15 is preferably formed by cutting away portions of the wall of a tube, as indicated at 30, to afford access to the stem packing nut and also to reduce the cross-sectional area of metal available for transmitting heat to the body. One end of the tube is rigidly attached to the valve body as at 28. A flange 29 affixed to or integral with the opposite end of the tube mates with a flange 31 projected from the thread block. These flanges engage a thick ring or disc 32 of low heat conductivity material such as Bakelite and are individually locked to it by means of bolts 33 and 34. These bolts, as above described, are alternated in direction so that each flange is clamped only to the slightly heat conductive member without metallic contact between the flanges. This provides a thermal break between the yoke member and the thread block.

The form of the yoke member is not critical and the yoke arms may be given any desired section. The arcuate section illustrated, produced by cutting away portions of the wall of a tube, is preferred as affording a high degree of stiffness for a given cross section and a correspondingly high relation of rigidity to heat conductivity. Likewise, T-heads may be used in place of the flanges described, with some sacrifice of rigidity. The thermal break may be placed at the body end of the yoke, or in a medial position, instead of in the position shown.

In order to permit the valve to maintain, unchanged, the rate of flow for which it has been adjusted, it is desirable to form the yoke arms and the valve stem of the same metal, or of two metals or alloys having substantially the same coefficient of expansion. This affords freedom from differential expansion and consequent undesired changes in adjustment.

In some cases it may be desired to use two metals or alloys in the valve stem, as for example stainless steel in that portion between the thermal break and the body and hard brass or bronze in the hand-wheel end. In such case the same result, of avoiding differential expansion, may be had by placing the thermal break in the yoke in the same longitudinal position as the break in the stem and using the same metals in the two ends of the yoke as were used in the stem. Or, if preferred, a single metal or alloy having an intermediate expansion factor may be used for the yoke, the material being so selected as to compensate the expansion and contraction of the stem over the temperature range encountered in use.

It is desirable, though not essential, to use for at least the cold ends of the stem and yoke an alloy, for example, stainless steel, having a relatively low order of heat conductivity. This step minimizes flow into the valve body of atmospheric heat absorbed by the yoke and stem on the cold side of their respective thermal breaks.

A secondary but still important advantage of the almost complete insulation of the warm end from the cold end of the valve assembly is found in the avoidance of condensation of water on the stem and hand-wheel. These valves are usually deeply buried in insulating material, which is materially reduced in effectiveness if allowed to become wet, and it is impossible to exclude from such insulation the water condensed from the atmosphere by a cold valve stem. By keeping the projecting metallic parts warm, and therefore dry, both the effectiveness of the insulation and its appearance are preserved.

In actual construction, the valve assembly will usually be mounted on a control panel by means of a flange, now shown, affixed to thread block 13. This may be a radial extension of flange 31 or another flange independently projected from the thread block, as may be convenient.

Experience has shown that valves constructed according to the principles above described maintain the thread block and the warm end of the stem at a close approximation to the temperature of the atmosphere, even while the valve body is operating at a temperature substantially that of liquid nitrogen boiling at atmospheric pressure. In the use of such valves only minute quantities of heat are transmitted into the body and the efficiency of the valve as a means for producing refrigeration is close to the theoretical. Such valves have further proven to be absolutely dependable in operation and free from any of the drawbacks manifested by the expansion valves of the prior art.

I claim:

1. An expansion valve comprising a body having a flow passage therethrough, a sectional valve stem axially movable as a unit to control the flow through said passage, a thread block engaging a thread on said valve stem for producing said axial movement on change in the relative angular position of said stem and block, an open yoke member and a thermal break of material of low heat conductivity interposed between said body and said thread block and a thermal break of material of low heat conductivity interposed between sections of said stem at a point between said body and said thread block.

2. An expansion valve comprising a body having a flow passage therethrough, a sectional valve stem arranged to control the flow through said passage, a thread block engaging threads on said valve stem, a frame member and a thermal break member of material having a low heat conductivity, means connecting said members together, said frame and thermal break members being interposed between said body and thread block, one of said members being connected to said thread block and the other of said members being connected to said body, and a thermal break of material of low heat conductivity interposed between the sections of said stem at a point between said body and said thread block.

3. A valve for handling fluids having a body adapted for location in a cold zone, comprising two sections adapted to extend from said cold zone to a warm zone, a heat insulator between said sections, means connecting said insulator to one section and insulated thereby from the other section, and means connecting said insulator to said other section and insulated thereby from said first mentioned section.

4. In a valve comprising a body member, a yoke member, and a thread block member, a thermal break of material having a low heat conductivity interposed between two of said members, means connecting said thermal break to one of said two members and insulated by said thermal break from the other of said two members, and means connecting said thermal break to the other of said two members and insulated by said thermal break from the first of said two members.

5. An expansion valve for fluid under high pressure and which upon expanding produces refrigeration, comprising a body having a flow passage therethrough for such fluid, a sectional valve stem movable in said body and arranged to control fluid flow through said passage, a thread block engaging threads on said valve stem, an open yoke member positioning said thread block with respect to said body, sealing means between the valve stem and body whereby the escape of fluid between the valve stem and body, which fluid would expand and cool the yoke and thread block, is prevented, a thermal break of material of low heat conductivity interposed between said body and said thread block and a thermal break of material of low heat conductivity interposed between the sections of said stem at a point between said body and said thread block.

6. An expansion valve comprising a body having a flow passage therethrough, a sectional valve stem axially movable as a unit to control the flow through said passage, a thread block engaging a thread on said valve stem for producing said axial movement on change in the relative angular position of said stem and block, an open yoke member including a thermal break of material of low heat conductivity connecting said body with said thread block, the portion of said yoke member situated between said thermal break and said body being formed of a metal having a heat conductivity not substantially exceeding 0.06 small calorie per second per centimeter cube per degree centigrade, and a thermal break of material of low heat conductivity interposed between sections of said stem at a point between said body and said block.

7. An expansion valve comprising a body having a flow passage therethrough, a sectional valve stem axially movable as a unit to control the flow through said passage, a thread block engaging a thread on said valve stem for producing said axial movement on change in the relative angular position of said stem and block, an open yoke member including a thermal break of material of low heat conductivity connecting said body with said thread block, and a thermal break of material of low heat conductivity interposed between sections of said stem at a point between said body and said thread block, the portion of said stem between the thermal break therein and said body being formed of a metal having a heat conductivity not substantially exceeding 0.06 small calorie per second per centimeter cube per degree centigrade.

8. In an expansion valve adapted for use with highly compressed gaseous refrigerants and operating at an extreme temperature difference between the body end and the actuating end: a body member having a flow orifice formed therein; a thread block; a stem threaded into said block and extending into said body to vary the effective area of said orifice; yoke arms positioning said thread block with respect to said orifice, and thermal breaks interposed in said arms and said stem, said arms and said stem being of materials selected to cause said arms and said stem to expand and contract equally with equal change in temperature, thereby avoiding spontaneous changes in said effective orifice area.

CARL R. ANDERSON.

REFERENCES CITED

The following references are of record in the file of this patent:

UNITED STATES PATENTS

| Number | Name | Date |
|---|---|---|
| 1,619,335 | Donnelly | Mar. 1, 1927 |
| 1,875,511 | Shivers | Sept. 11, 1932 |
| 2,209,216 | Wile | July 23, 1940 |
| 2,259,280 | Wile | Oct. 14, 1941 |
| 2,153,819 | Van Vorhees | Apr. 11, 1939 |
| 1,987,948 | Smith | Jan. 15, 1935 |
| 1,828,478 | Sparks | Oct. 20, 1931 |
| 1,727,693 | Beyer | Sept. 10, 1929 |